(12) United States Patent
Kowalska et al.

(10) Patent No.: US 12,487,604 B2
(45) Date of Patent: Dec. 2, 2025

(54) NAVIGATION FOR A ROBOTIC WORK TOOL SYSTEM

(71) Applicant: HUSQVARNA AB, Huskvarna (SE)

(72) Inventors: Kamila Kowalska, Tennhult (SE); Jakob Malm, Jönköping (SE); Jimmy Axelsson, Nässjö (SE); Åke Wettergren, Mölndal (SE); Georg Hägele, Malmö (SE); Jonas Hejderup, Borås (SE); Micael Hafström, Jönköping (SE); Herman Jonsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 233 days.

(21) Appl. No.: 18/195,100

(22) Filed: May 9, 2023

(65) Prior Publication Data

US 2023/0359221 A1    Nov. 9, 2023

(30) Foreign Application Priority Data

May 9, 2022 (SE) .................................. 2250556-4

(51) Int. Cl.
*G05D 1/00* (2024.01)
*A01D 34/00* (2006.01)
*A01D 101/00* (2006.01)

(52) U.S. Cl.
CPC ......... *G05D 1/0289* (2013.01); *A01D 34/008* (2013.01); *A01D 2101/00* (2013.01)

(58) Field of Classification Search
CPC .... G05D 1/0289; G05D 1/247; G05D 1/6482; G05D 1/693; G05D 2105/15; G05D 2107/23; G05D 2109/10; G05D 2111/36; G05D 1/6985; G05D 1/221; G05D 1/248; G05D 1/617; G05D 1/692; A01D 34/008; A01D 2101/00
See application file for complete search history.

(56) References Cited

U.S. PATENT DOCUMENTS

| | | | |
|---|---|---|---|
| 10,384,870 B2 * | 8/2019 | Geiger | ................. B65G 1/1375 |
| 12,008,496 B1 * | 6/2024 | Vasanth | ......... G06Q 10/063114 |
| 2010/0094481 A1 | 4/2010 | Anderson | |
| 2017/0038777 A1 * | 2/2017 | Harvey | ................ G05D 1/0027 |
| 2018/0178376 A1 * | 6/2018 | Lalonde | ................. B25J 9/0084 |

(Continued)

FOREIGN PATENT DOCUMENTS

| | | |
|---|---|---|
| SE | 1951449 A1 | 6/2021 |
| SE | 2050385 A1 | 10/2021 |
| SE | 544288 C2 | 3/2022 |

OTHER PUBLICATIONS

Swedish Office Action and Search Report for Swedish Application No. 2250556-4, Mailed on Jan. 12, 2023.

*Primary Examiner* — Sze-Hon Kong
(74) *Attorney, Agent, or Firm* — Burr & Forman

(57) ABSTRACT

A method for use in a robotic work tool system (200) comprising a first robotic work tool (100:1) and a second robotic work tool (100:1) arranged to operate in an operational area (205) comprising a transport area (TA), the method comprising determining (310) that a transport is upcoming, and in response thereto moving (320) to a start area (SA); waiting (330) for the second robotic work tool (100:2) to reach the start area (SA); and then determining (340) that it is time to enter the transport area (TA), and in response thereto moving (350) through the transport area (TA) as a group.

19 Claims, 6 Drawing Sheets

(56) References Cited

U.S. PATENT DOCUMENTS

| | | | |
|---|---|---|---|
| 2018/0242806 A1 | 8/2018 | Haegermarck | |
| 2018/0364056 A1* | 12/2018 | Iwasaki | G08G 1/096855 |
| 2019/0332104 A1* | 10/2019 | Woodrow | G08G 5/22 |
| 2020/0019148 A1* | 1/2020 | Hahn | G05B 19/4189 |
| 2021/0294330 A1 | 9/2021 | Ko et al. | |
| 2021/0370869 A1* | 12/2021 | Tazume | B60R 25/20 |
| 2022/0147902 A1* | 5/2022 | Inagaki | G08G 1/22 |
| 2022/0172151 A1* | 6/2022 | Tazume | G06N 7/01 |
| 2022/0179409 A1* | 6/2022 | Bhagat | G05D 1/0038 |
| 2022/0223048 A1* | 7/2022 | Czinger | G08G 1/22 |
| 2023/0136829 A1* | 5/2023 | Zhang | G06Q 10/08355 |
| | | | 705/7.26 |
| 2023/0274646 A1* | 8/2023 | Roidl | G08G 1/164 |
| | | | 701/117 |
| 2025/0018945 A1* | 1/2025 | Sato | G05D 1/227 |

\* cited by examiner

NAVIGATION FOR A ROBOTIC WORK TOOL SYSTEM

TECHNICAL FIELD

This application relates to a robotic work tool and in particular to a system and a method for providing an improved navigation for robotic work tools, such as lawnmowers, in such a system.

BACKGROUND

Automated or robotic work tools such as robotic lawnmowers are becoming increasingly more popular and so is the use of the more than one robotic working tool(s) in the same operational area. The risk of collision between different robots has thus increased. There is also a risk of dead-locks occurring as two or more robotic work tools may end up in a situation where they hinder one another from continued operation. The risk of collisions and dead-locks is especially high during transport, possibly crossing paths of other machines and work areas.

Thus, there is a need for an improved manner of avoiding collisions during transport.

SUMMARY

The inventors are proposing to avoid or at least reduce the risk of collisions by transporting multiple robotic work tools in a group. This also or alternatively enables for supervision by a single operator for multiple robotic work tools.

Group transports consist of a start area, transport paths for each respective robotic work tool from their current position to the start area, a common transport area between the start area point and a goal area, and transport paths from the goal area to respective destinations for each machine.

A group transport area can be provided by the server rather than generated by the machines themselves, possibly including routing the transport path in such a way that it avoids other parts of the work area where other robotic work tools are active. After reaching the end of the common transport area, the robotic work tools separated from the group and are free to move on their own or to follow their pre-planned work paths for continued operation (or servicing or deactivation).

It is therefore an object of the teachings of this application to overcome or at least reduce those problems by providing by providing a robotic work tool system comprising a first robotic work tool and a second robotic work tool arranged to operate in an operational area comprising a transport area (TA), the first robotic work tool comprising a controller, wherein the controller is configured to: determine that a transport is upcoming, and in response thereto cause the first robotic work tool to move to a start area (SA); wait for the second robotic work tool to reach the start area (SA); and then determine that it is time to enter the transport area (TA), and in response thereto cause the first robotic work tool to move through the transport area (TA).

It is also an object of the teachings of this application to overcome the problems by providing a method for use in a robotic work tool system comprising a first robotic work tool and a second robotic work tool arranged to operate in an operational area comprising a transport area (TA), the method comprising determining that a transport is upcoming, and in response thereto moving to a start area (SA); waiting for the second robotic work tool to reach the start area (SA); and then determining that it is time to enter the transport area (TA), and in response thereto moving through the transport area (TA).

In some embodiments the controller is further configured to cause the first robotic work tool to move through the transport area (TA) together with the second robotic work tool as a robotic work tool group.

In some embodiments the controller is further configured to cause the first robotic work tool to follow a transport path to the start area (SA).

In some embodiments controller is further configured to determine that a transport is upcoming at the beginning or end of an operation.

In some embodiments the controller is further configured to determine that a transport is upcoming by determining that a charging is needed.

In some embodiments the controller is further configured to determine that a transport is upcoming by receiving an indication thereof from a server.

In some embodiments the controller is further configured to determine that a transport is upcoming by receiving an indication thereof from a user equipment.

In some embodiments the controller is further configured to determine that a transport is upcoming by receiving an indication thereof from the second robotic work tool.

In some embodiments the controller is further configured to determine that it is time to enter the transport area (TA) by determining that all other robotic work tools in a group of robotic work tools have reached the start area (SA).

In some embodiments the controller is further configured to determine that it is time to enter the transport area (TA) by determining that all robotic work tools having signaled that a transport is upcoming have arrived at the start area (SA).

In some embodiments the controller is further configured to determine that it is time to enter the transport area (TA) by determining that all robotic work tools having signaled that a transport is upcoming and are within a time distance of the start area at the time of signaling have arrived at the start area (SA).

In some embodiments the controller is further configured to determine that it is time to enter the transport area (TA) by receiving an indication thereof from a server.

In some embodiments the controller is further configured to determine that it is time to enter the transport area (TA) by receiving an indication thereof from a user equipment.

In some embodiments the controller is further configured to determine that it is time to enter the transport area (TA) by receiving an indication thereof from the second robotic work tool.

In some embodiments the controller is further configured to determine that it is time to enter the transport area (TA) by determining that a farthest away robotic work tool is at a time distance away from the start area (SA) equaling the time distance through the transport area for the first robotic work tool.

In some embodiments the controller is further configured to determine that it is time to enter the transport area (TA) by determining that a last robotic work tool will be able to reach the start area (SA) as a second last robotic work tool enters the transport area (TA).

In some embodiments the controller is further configured to cause the first robotic work tool to keep a first speed through the transport area, wherein the second robotic work tool is configured to keep a second speed through the transport area. In some embodiments the first speed is higher than the second speed. In some embodiments the first speed is the same as the second speed.

In some embodiments the controller is further configured to cause the first robotic work tool to keep a specified distance to the second robotic work tool in the transport area.

In some embodiments the controller is further configured to cause the first robotic work tool to determine that it is approaching the second robotic work tool in the transport area (TA), and in response thereto adapt its speed.

In some embodiments the controller is further configured to cause the first robotic work tool to adapt its speed by stopping, waiting and then proceeding.

In some embodiments the controller is further configured to cause the first robotic work tool to adapt its speed by reducing its speed.

In some embodiments the first robotic work tool further comprises a collision sensor, and wherein the controller is further configured to cause the first robotic work tool to determine that it is approaching the second robotic work tool utilizing the collision sensor.

In some embodiments the controller is further configured to receive an indication of a speed from a server.

In some embodiments the controller is further configured to cause the first robotic work tool to wait in a goal area (GA) for the second robotic work tool to arrive in the goal area as the transport area is exited before proceeding.

In some embodiments the controller is further configured to cause the first robotic work tool to follow a transport path out of the transport area.

In some embodiments the first robotic work tool is supervised by a supervisor.

In some embodiments the controller is further configured to cause the first robotic work tool to determine that a transport is upcoming by receiving an indication thereof from the supervisor.

In some embodiments the controller is further configured to cause the first robotic work tool to determine that it is time to enter the transport area by receiving an indication thereof from the supervisor.

In some embodiments the controller is further configured to cause the first robotic work tool to receive an indication of a speed to keep through the transport area from the supervisor.

In some embodiments the controller is further configured to cause the first robotic work tool to receive an indication that the supervisor has stopped, and in response thereto adapt its speed.

In some embodiments the controller is further configured to cause the first robotic work tool to receive an indication that the supervisor has reached the start area, and in response thereto adapt its speed.

In some embodiments the controller is further configured to cause the first robotic work tool to stop if it reaches or exceeds a maximum distance from the supervisor.

In some embodiments the supervisor is a robotic work tool.

In some embodiments the supervisor is a human operator.

In some embodiments the robotic work tool is a robotic lawnmower.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein.

Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic work tools.

Figure 1:
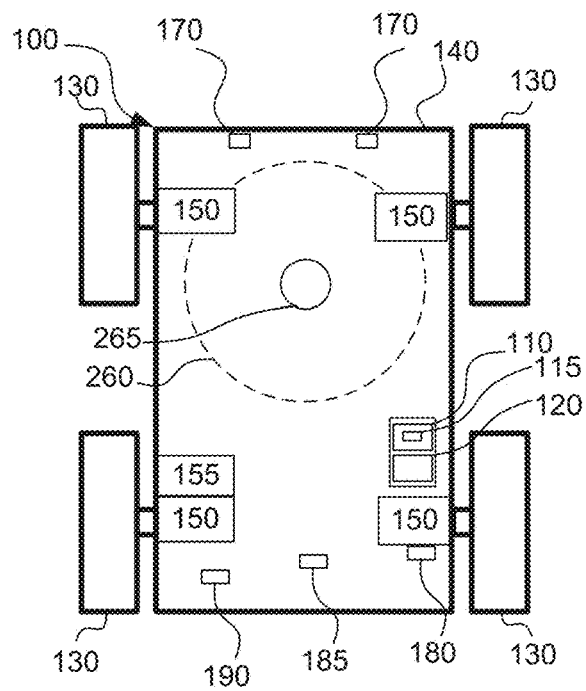
FIG. 1 shows a schematic view of the components of an example of a robotic work tool being a robotic lawnmower according to some example embodiments of the teachings herein.

FIG. 1 shows a schematic overview of a robotic work tool 100, here exemplified by a robotic lawnmower 100. The robotic work tool 100 may be a multi-chassis type or a mono-chassis type (as in FIG. 1). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 1 meter for large robots arranged to service for example airfields.

It should be noted that even though the description herein is focussed on the example of a robotic lawnmower, the teachings may equally be applied to other types of robotic work tools, such as robotic watering tools, robotic golfball collectors, and robotic mulchers to mention a few examples.

In some embodiments, and as will be discussed below, the robotic work tool is a semi-controlled or at least supervised autonomous work tool, such as farming equipment or large lawnmowers, for example riders or comprising tractors being autonomously controlled.

It should also be noted that the robotic work tool is a self-propelled robotic work tool, capable of autonomous navigation within a work area, where the robotic work tool propels itself across or around the work area in a pattern (random or predetermined).

The robotic work tool 100, exemplified as a robotic lawnmower 100, has a main body part 140 and a plurality of wheels 130 (in this example four wheels 130, but other number of wheels are also possible, such as three or six).

The main body part 140 substantially houses all components of the robotic lawnmower 100. At least some of the wheels 130 are drivably connected to at least one electric motor 155 powered by a battery 150. It should be noted that even if the description herein is focused on electric motors, combustion engines may alternatively be used, possibly in combination with an electric motor. In the example of FIG. 1, each of the wheels 130 is connected to a common or to a respective electric motor 155 for driving the wheels 130 to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150.

It should be noted that wheels 130 driven by electric motors is only one example of a propulsion system and other variants are possible such as caterpillar tracks.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130 forms the base of a navigation system (possibly comprising further components) for the robotic lawnmower, enabling it to be self-propelled as discussed.

The controller 110 may be implemented using any suitable, available processor or Programmable Logic Circuit (PLC). The memory 120 may be implemented using any commonly known technology for computer-readable memories such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic work tools. Examples of such wireless communication devices are Bluetooth®, WiFi® (IEEE802.11b), Global System Mobile (GSM) and LTE (Long Term Evolution), to name a few. The robotic lawnmower 100 may be arranged to communicate with a user equipment (referenced 250 in FIG. 2, as an example of a connected device) as discussed in relation to FIG. 2 below for providing information regarding status, location, and progress of operation to the user equipment as well as receiving commands or settings from the user equipment. Alternatively or additionally, the robotic lawnmower 100 may be arranged to communicate with a server (referenced 240 in FIG. 2A) for providing information regarding status, location, and progress of operation as well as receiving commands or settings.

The robotic lawnmower 100 also comprises a grass cutting device 160, such as a rotating blade 160 driven by a cutter motor 165. The grass cutting device being an example of a work tool 160 for a robotic work tool 100. In embodiments where the robotic work tool 100 is exemplified as an automatic grinder, the work tool 160 is a rotating grinding disc.

The robotic lawnmower 100 may further comprise at least one signal navigation sensor 185 configured to provide navigational information (such as position) based on receiving one or more signals. In some embodiments the signal navigation sensor is an optical navigation sensor, such as a camera-based sensor and/or a laser-based sensor. In some embodiments the navigation sensor is a beacon navigation sensor, such as a Radio Frequency receiver, such as an Ultra Wide Band (UWB) receiver or sensor, configured to receive signals from a Radio Frequency beacon, such as a UWB beacon. Alternatively or additionally, the beacon navigation sensor may be an optical receiver configured to receive signals from an optical beacon. In some embodiments the navigation sensor is a satellite navigation sensor such as a GPS (Global Positioning System) device or other Global Navigation Satellite System (GNSS) device. In some embodiments the navigation sensor is a combination of one or more of the examples given above.

The robotic lawnmower 100 may also or alternatively comprise deduced reckoning sensors 180. The deduced reckoning sensors may be odometers, accelerometer or other deduced reckoning sensors. In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

For enabling the robotic lawnmower 100 to navigate with reference to a boundary wire emitting a magnetic field caused by a control signal transmitted through the boundary wire, the robotic lawnmower 100 is, in some embodiments, further configured to have at least one magnetic field sensor 170 arranged to detect the magnetic field and for detecting the boundary wire and/or for receiving (and possibly also sending) information to/from a signal generator (will be discussed with reference to FIG. 2). In some embodiments, the sensors 170 may be connected to the controller 110, possibly via filters and an amplifier, and the controller 110 may be configured to process and evaluate any signals received from the sensors 170. The sensor signals are caused by the magnetic field being generated by the control signal being transmitted through the boundary wire. This enables the controller 110 to determine whether the robotic lawnmower 100 is close to or crossing the boundary wire, or inside or outside an area enclosed by the boundary wire.

The robotic lawnmower 100 is in some embodiments arranged to operate according to a map application representing one or more work areas (and possibly the surroundings of the work area(s)) stored in the memory 120 of the robotic lawnmower 100. The map application may be generated or supplemented as the robotic lawnmower 100 operates or otherwise moves around in the work area 205. In some embodiments, the map application includes one or more start regions and one or more goal regions for each work area. In some embodiments, the map application also includes one or more transport areas.

As discussed in the above, the map application is in some embodiments stored in the memory 120 of the robotic working tool(s) 100. In some embodiments the map application is stored in the server (referenced 240 in FIG. 2A). In some embodiments maps are stored both in the memory 120 of the robotic working tool(s) 100 and in the server, wherein the maps may be the same maps or show subsets of features of the area.

The robotic working tool 100 may also comprise additional sensors 190 for enabling operation of the robotic working tool 100, such as visual sensors (for example a camera) for enabling camera-based navigation and/or for enabling object detection, ranging sensors for enabling SLAM-based navigation (Simultaneous Localization and Mapping), moisture sensors, collision sensors, wheel load sensors to mention a few examples of sensors.

Figure 2A:
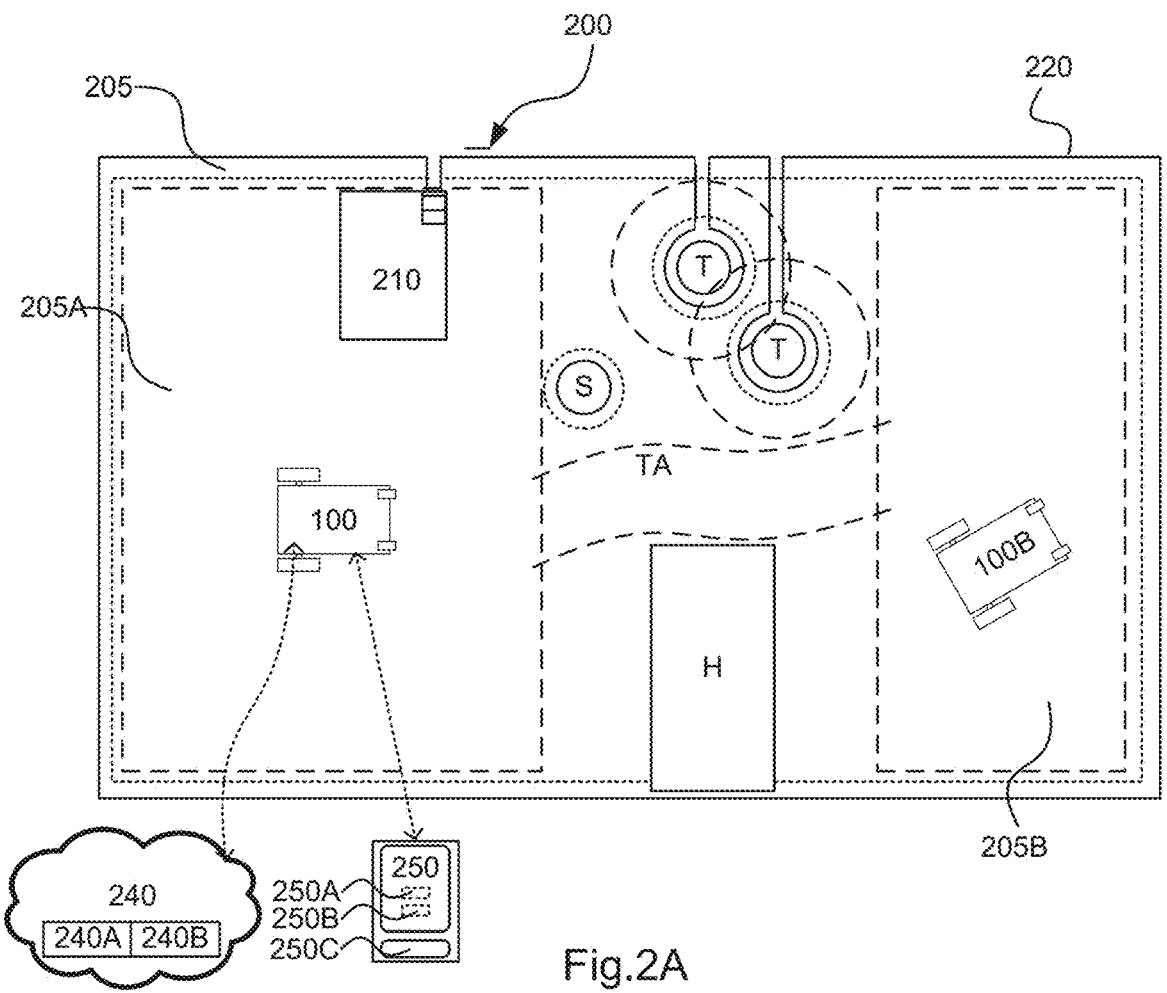
FIG. 2A shows a schematic view of a robotic work tool system according to some example embodiments of the teachings herein.

FIG. 2A shows a robotic work tool system 200 in some embodiments. The schematic view is not to scale. The robotic work tool system 200 comprises one or more robotic work tools 100 according to the teachings herein. It should be noted that the operational area 205 shown in FIG. 2A is simplified for illustrative purposes. The robotic work tool system comprises a boundary 220 that may be virtual and/or electro mechanical. An example of a virtual boundary is a set of coordinates representing or defining a geofence that can be navigated using the signal navigation sensor 180. An example of an electro mechanical boundary is a magnetic field generated by a control signal being transmitted through a boundary wire, and which magnetic field is sensed by sensor in the robotic work tool 100.

It should be noted though that some embodiments utilize virtual boundaries, some embodiments utilize electro mechanical boundaries and some embodiments utilize both virtual and electro mechanical boundaries. In embodiments where a virtual boundary is utilized, the magnetic sensors 170 are optional. Similarly, in embodiments where an electro mechanical boundary is used, the signal navigation sensor 180 is optional.

The robotic work tool system 200 further comprises a station 210 possibly at a station location. A station location may alternatively or additionally indicate a service station, a parking area, a charging station or a safe area where the robotic work tool may remain for a time period between or during operation session.

As with FIG. 1, the robotic work tool(s) is exemplified by a robotic lawnmower, whereby the robotic work tool system may be a robotic lawnmower system or a system comprising a combinations of robotic work tools, one being a robotic lawnmower, but the teachings herein may also be applied to other robotic work tools adapted to operate within a work area.

The one or more robotic working tools 100 of the robotic work tool system 200 are arranged to operate in an operational area 205, which in this example comprises a first work area 205A and a second work area 205B connected by a transport area TA. However, it should be noted that an operational area may comprise a single work area or one or more work areas, possibly arranged adjacent for easy transition between the work areas, or connected by one or more transport paths or areas, also referred to as corridors. In the following work areas and operational areas will be referred to interchangeably, unless specifically indicated.

The operational area 205 is in this application exemplified as a garden, but can also be other work areas as would be understood, such as an airfield. As discussed above, the garden may contain a number of obstacles, for example a number of trees, stones, slopes and houses or other structures.

In some embodiments the robotic work tool is arranged or configured to traverse and operate in work areas that are not essentially flat, but contain terrain that is of varying altitude, such as undulating, comprising hills or slopes or such. The ground of such terrain is not flat and it is not straightforward how to determine an angle between a sensor mounted on the robotic work tool and the ground. The robotic work tool is also or alternatively arranged or configured to traverse and operate in a work area that contains obstacles that are not easily discerned from the ground. Examples of such are grass or moss covered rocks, roots or other obstacles that are close to ground and of a similar colour or texture as the ground. The robotic work tool is also or alternatively arranged or configured to traverse and operate in a work area that contains obstacles that are overhanging, i.e. obstacles that may not be detectable from the ground up, such as low hanging branches of trees or bushes. Such a garden is thus not simply a flat lawn to be mowed or similar, but a work area of unpredictable structure and characteristics. The work area 205 exemplified with referenced to FIG. 2A, may thus be such a non-uniform work area as disclosed in this paragraph that the robotic work tool is arranged to traverse and/or operate in.

The robotic working tool system 200 may alternatively or additionally comprise or be arranged to be connected to a server 240, such as a cloud service, a cloud server application or a dedicated server 240. The connection to the server 240 may be direct from the robotic working tool 100, direct from a user equipment 250, indirect from the robotic working tool 100 via the service station 210, and/or indirect from the robotic working tool 100 via the user equipment 250.

A skilled person would understand that a server, a cloud server or a cloud service may be implemented in a number of ways utilizing one or more controllers 240A and one or more memories 240B that may be grouped in the same server or over a plurality of servers.

The user equipment 250 may be a smartphone, a tablet computer or a remote control panel, and comprises one or more controllers 240A and one or more memories 240B for storing instructions that when executed by the controller 150A controls the operation of the user equipment. The user equipment 250 also comprises a user interface for receiving commands from a user, such as buttons or virtual keys 250C.

In the below, several embodiments of how the robotic work tool may be adapted will be disclosed. It should be noted that all embodiments may be combined in any combination providing a combined adaptation of the robotic work tool.

The inventors have realized that when tow or more robotic work tools are operating in the same work area there is a risk of two or more of the robotic work tools colliding. This risk is increased the closer to one another the robotic work tools are operating. An especially high risk of collision exists when two or more autonomously controlled robotic work tools are to be transported from a first work area to a second work area especially if such transport is to be done through a transport corridor or area.

This is because the transport area is usually a relative narrow corridor where autonomous robotic work tools may collide with one another.

The inventors have further realized that as autonomously controlled robotic work tools are unlikely to enter the transport corridor at a similar time, the transport corridor will also be occupied for long periods of time, making other transport in that area impossible or undesired. For example, if the robotic work tools are to be transported along a footpath, that footpath may be unsuitable for other uses during the transport of the robotic work tools.

Figure 2B:
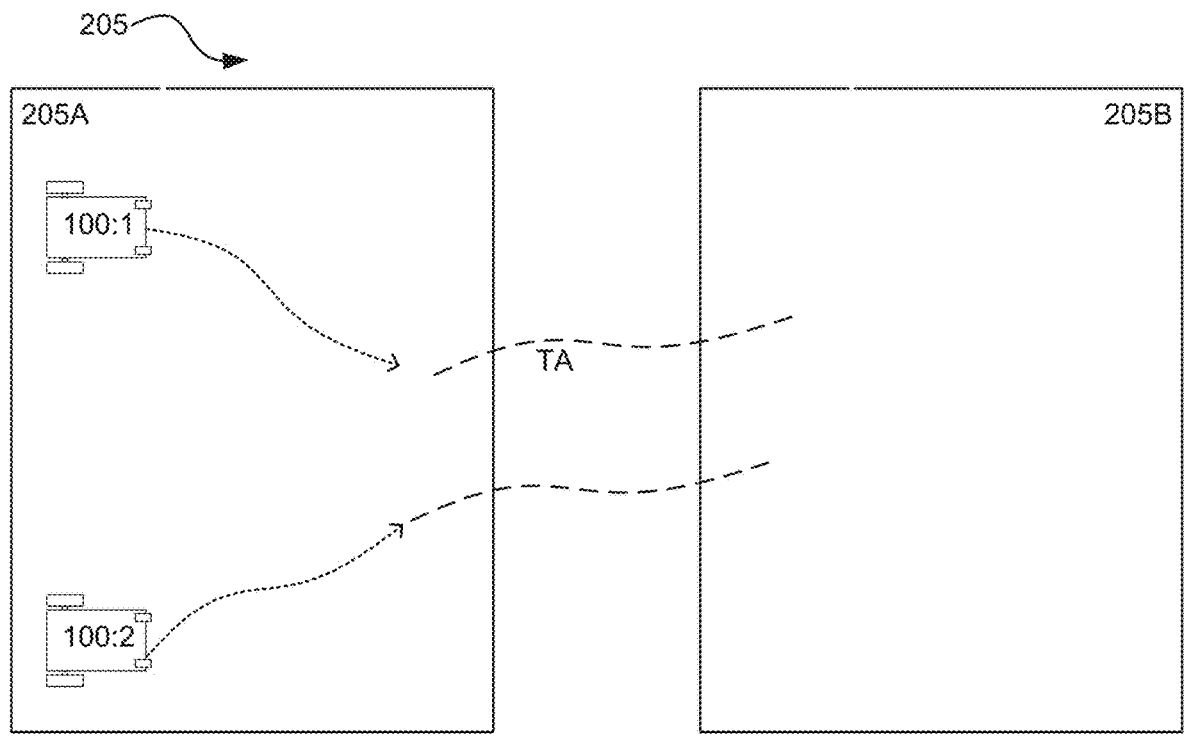
FIG. 2B shows a schematic view of a robotic work tool system according to some example embodiments of the teachings herein.

FIG. 2B shows a simplified view of a robotic work tool system 200 as in FIG. 2A, where a first robotic work tool 100:1 and a second robotic work tool 100:2 are operating in a first work area 205A of an operational area 205. As discussed above if the two robotic work tools are to autonomously determine when and how to transport to the second work area 205B, they may collide with one another or render the transport path TA unsuitable for other uses for an unnecessarily long time period. As mentioned above, the teachings herein also or alternatively enable for supervision of multiple robotic work tools by a single operator, buy ensuring that the robotic work tools are transferred in close vicinity of one another.

To overcome these problems or at least mitigate the collision risks and/or reduce the time that the transport area is unsuitable for other uses, the inventors are proposing a simple yet highly efficient manner of transporting a plurality of robotic work tools.

Figure 2C:
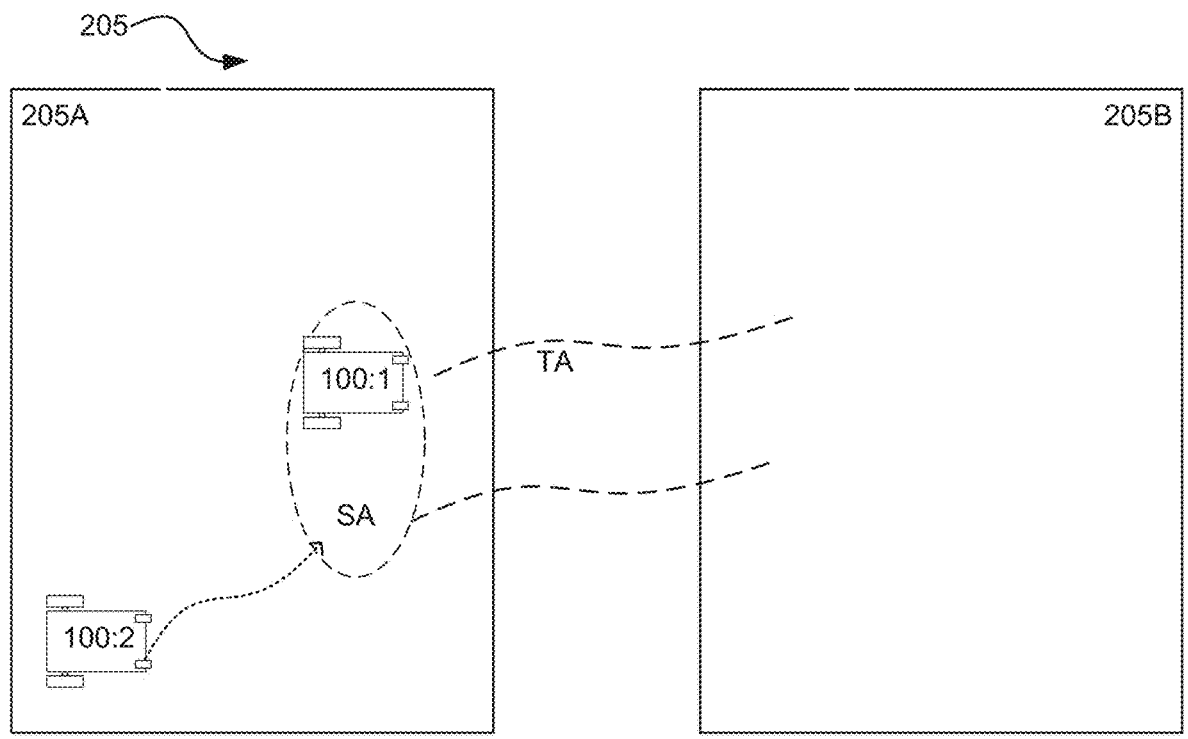
FIG. 2C shows a schematic view of a robotic work tool system according to some example embodiments of the teachings herein.

As it is determined that the first robotic work tool 100:1 is to be transported, the first robotic work tool 100:1 is configured to navigate to a start area SA from which the transport area TA can be entered. FIG. 2C shows a view of a robotic work tool system 200 as in FIGS. 2A and 2B where the first robotic work tool 100:1 has moved to the start area SA.

FIG. 2C also shows transport paths from the robotic work tools' individual positions to the transport area. In some embodiments, the robotic work tool 100 is configured to follow such a transport path, which leads the robotic work tool on a path so that it does not interfere or risk colliding with another robotic work tool. In some such embodiments, the transport path is a path that keeps a minimum distance from the other robotic work tools 100. The minimum distance is in some examples 1, 5 10, in the range 1 to 5, in the range 1 to 10 meters. In some embodiments the robotic work tool determines the transport path, and in some embodiments the server 240 determines the transport path. The transport paths area shown as dotted arrows.

Below some embodiments of how to determine that a robotic work tool is to be transported are discussed.

In some embodiments all the robotic work tool will be transported at the same time, such as at the beginning of a (scheduled) operation, or at the end of a scheduled operation. In some such embodiments, the robotic work tools may be the whole fleet of robotic work tools. In some alternative such embodiments the robotic work tools may be a group of robotic work tools that are associated with a (scheduled) operation. In such embodiments, all concerned robotic work tools will know be transported at a given time, namely the start or end of an operation.

In some embodiments the robotic work tool will signal that a transport is upcoming as the robotic work tool determines that it is in need of a transport. This may be when the robotic work tool is to begin an operation (possibly a next sub operation), at the end of an operation (possibly a sub operation) or when the robotic work tool reaches a battery level where recharging is needed.

In some embodiments the first (or second) robotic work tool is configured to signal the second (or first) robotic work tool to let the other robotic work tool know that a transport is upcoming.

In some embodiments the robotic work tool 100 will also signal the expected time until the robotic work tool reaches the start area, i.e. the time distance to the start area.

In some embodiments the first robotic work tool is configured to signal the server that a transport is upcoming as the robotic work tool determines that it is in need of a transport whereby the server can determine which robotic work tool(s) should be transported in a group.

In some embodiments the server determines when it is time for a transport.

In some embodiments the user equipment 250 provides commands for which robotic work tools 100 that a transport is upcoming.

As the first robotic work tool 100:1 has reached the start area, the first robotic work tool 100:1 then waits until it is time to enter the transport area and execute the transportation. To reduce the risk of collision as well as reducing the time the transport area is occupied, the inventors are proposing to transport the robotic work tools in group(s). The first robotic work tool 100:1 thus generally waits for another robotic work tool 100 to also enter the start area SA.

Below some embodiments of how to determine that it is time to start the transport and enter the transport area is discussed.

In some embodiments the robotic work tool waits until all other robotic work tools have reached the start area SA. In some embodiments the robotic work tool waits until all robotic work tools that have signaled that a transport is upcoming have reached the start area. This allows for groups of robotic work tools to transport together without having to wait for the whole fleet to arrive, which may render some robotic work tools useless for great periods of time unnecessarily of the different robotic work tools have different transport needs. In some embodiments the robotic work tool waits until all robotic work tools that have signaled that a transport is upcoming and which are within a time distance of the start area from when the robotic work tool signaled that it needed or wanted to transport have arrived at the start area SA. This allows for groups of robotic work tools to transport together without having to wait for the whole fleet to arrive, which may render some robotic work tools useless for great periods of time unnecessarily while waiting for robotic work tools that are far away.

In some embodiments the robotic work tool waits until the server 240 indicates that it is time to enter the transport area. In some such embodiments the robotic work tool will signal the server 240 that it has reached the start area when it reaches the start area.

In some embodiments the robotic work tool waits until the robotic work tool 100 that is furthest away (measured in time, i.e. the robotic work tool that will arrive last to the start area) is at a time distance away from the start area equaling the time distance through the transport area for the first robotic work tool 100:1. That is, the first robotic work tool 100:1 waits until the last robotic work tool has got an estimated time of arrival at the start area that coincides with the first robotic work tool's estimated time of arrival at the end of the transport area. This allows for a reduced waiting time as the group will start moving at a time when the last robotic work tool will be able to join the end of the group through the transport area.

Alternatively, the first robotic work tool 100 determines that it is time to enter the transport area at a time, where the last robotic work tool will be able to reach the start area as the second last robotic work tool enters the transport area.

In some embodiments, a time distance is seen as a distance that can be travelled in a specific time or less. In some examples the time is 1 minute, 5 minutes, 10 minutes, 15 minutes, 30 minutes in the range 1-10 minutes, in the range 1 to 15 minutes, in the range 1 to 30 minutes or in the range 1 to 60 minutes.

Figure 2D:
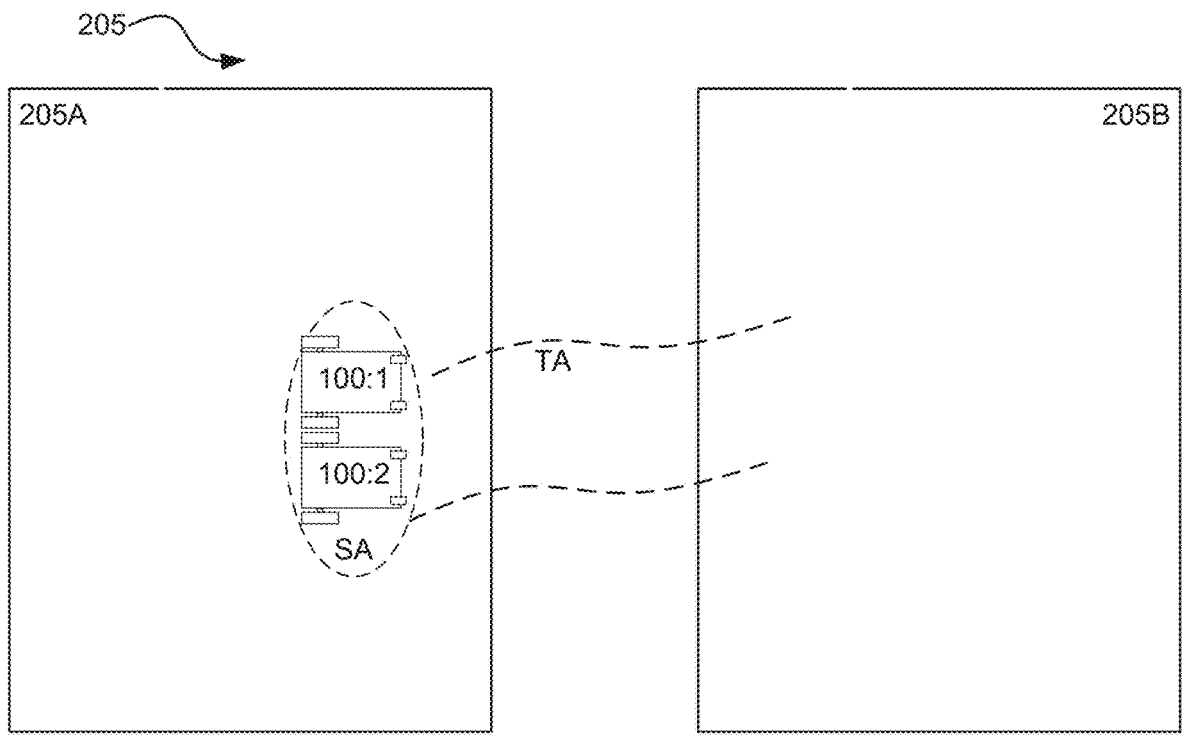
FIG. 2D shows a schematic view of a robotic work tool system according to some example embodiments of the teachings herein.

FIG. 2D shows a view of a robotic work tool system 200 as in FIGS. 2A, 2B and 2C where also the second robotic work tool 100:2 has moved to the start area SA.

As it is time to transport, the first robotic work tool 100:1 starts to propel or navigate through the transport area and so does the second robotic work tool 100:2.

In some embodiments the robotic work tool that arrived first to the start area initiates the transport and goes through the transport area first followed by the next robotic work tool to arrive. In some embodiments the robotic work tool that is closest to the transport area initiates the transport and goes through the transport area first followed by the next closest robotic work tool. And, in some embodiments the robotic work tool that has the easiest access to the transport area initiates the transport and goes through the transport area first followed by the robotic work tool which then has the easiest access. An easy access may in some embodiments be defined by a distance to the transport area, and in some embodiments be defined by whether there is any obstacles that need to be negotiated, such as other robotic work tools blocking the path, to reach the transport area. A fewer number of obstacles of course indicating an easier access.

Figure 2E:
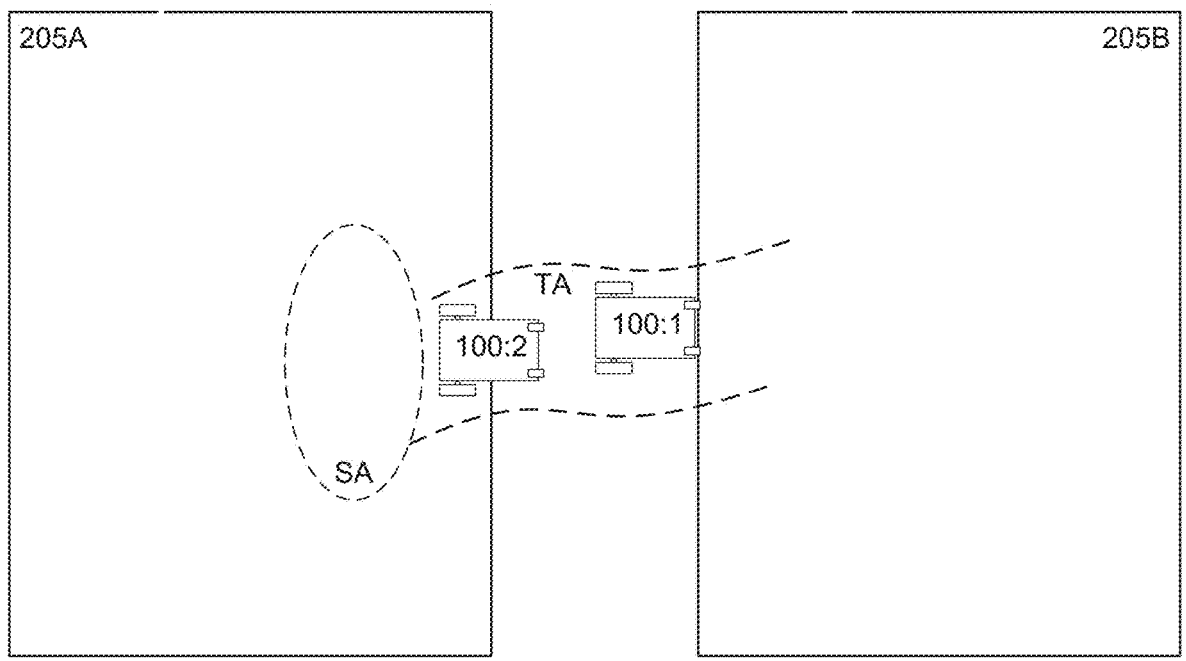
FIG. 2E shows a schematic view of a robotic work tool system according to some example embodiments of the teachings herein.

FIG. 2E shows a view of a robotic work tool system 200 as in FIGS. 2A, 2B, 2C and 2D where the first robotic work tool 100:1 and the second robotic work tool 100:2 are moving through the transport area. This allows for a controlled transport of the robotic work tools through the transport area and minimizes the time the transport area is occupied by the robotic work tools.

In some embodiments, the first robotic work tool 100:1 is configured to keep a first speed through the transport area, and the second robotic work tool 100:2 (assumingly being behind the first robotic work tool 100:1 in the transport area) is configured to keep a second speed through the transport area. In some such embodiments the first speed is higher than the second speed. This allows for the first robotic work tool 100:1 to keep in front of the second robotic work tool 100:2. In some such embodiments the first speed is 1 to 5%, 1 to 10%, or 5 to 10% higher than the second speed. In some alternative such embodiments the first speed is the same as the second speed. This allows for the first robotic work tool 100:1 to keep a steady distance to the second robotic work tool 100:2.

In some embodiments, the second robotic work tool 100:2 is configured to keep a specified distance to the first robotic work tool 100:1 (assumingly in front of the second robotic work tool 100:2) in the transport area.

The specified distance may be set as the distance between the robotic work tools at which the robotic work tools enter the transport area. Alternatively or additionally the specified distance may be set as predefined or by the server. The distance kept may be determined during movement utilizing the visual sensor, or the laser sensor or the radar sensor 190. Alternatively or additionally the distance may be determined utilizing the signal navigation sensor 180, whereby a position for each robotic work tool is determined (by the robotic work tool or by the server) and the two positions are compared (by the server 240 or by one or both of the robotic work tools 100) to determine the distance. In such embodiments the second robotic work tool will adapt its speed to keep the distance.

In some embodiments, the second robotic work tool 100:2 is configured to determine that it is approaching (getting closer to) the first robotic work tool 100:1 (assumingly in front of the second robotic work tool 100:2) in the transport area. In some such embodiments, the robotic work tool is configured to stop, wait and then proceed (possibly at a reduced speed) in response thereto. In some alternative such embodiments, the robotic work tool is configured to reduce its speed (possibly for a time period) in response thereto, enabling the robotic work tool in front to move away.

In some such embodiments the robotic work tool is configured to determine that it is approaching the first robotic work tool utilizing the visual sensors, the radar sensors, and/or the laser sensors 190. In some alternative or additional such embodiments the robotic work tool is configured to determine that it is approaching the first robotic work tool utilizing the collision sensor. In such embodiments the robotic work tool is thus configured to change the response to a detected collision when being transported. Normally a response to a collision is to stop, reverse, turn and try a new direction which would lead to the robotic work tool exiting the transport area.

In some embodiments will the robotic work tool signal any changes in speed to the other robotic work tools, or at least the robotic work tools behind so that they can preemptively change their speed without further collisions. In some such embodiments, the signaling is from robotic work tool to robotic work tool. In some alternative or additional embodiments the signaling is from robotic work tool to server to robotic work tool, whereby the server can maintain an overview of the traffic through the transport area and direct the robotic work tools accordingly.

It should be noted that the labelling of first and second robotic work tool depends on a perspective of which robotic work tool one is looking at and in some instances the first robotic work tool may be seen as the second robotic work tool and vice-versa.

In some embodiments, the robotic work tool 100 is further configured to stop in a goal area GA as the robotic work tool 100 exits the transport area. The goal area is an area that can be reached from the transport area. In some embodiments the robotic work tool moves to a side as it enters the goal area so as to not block the exit of the transport area allowing any robotic work tools behind to also pass through.

Figure 2F:
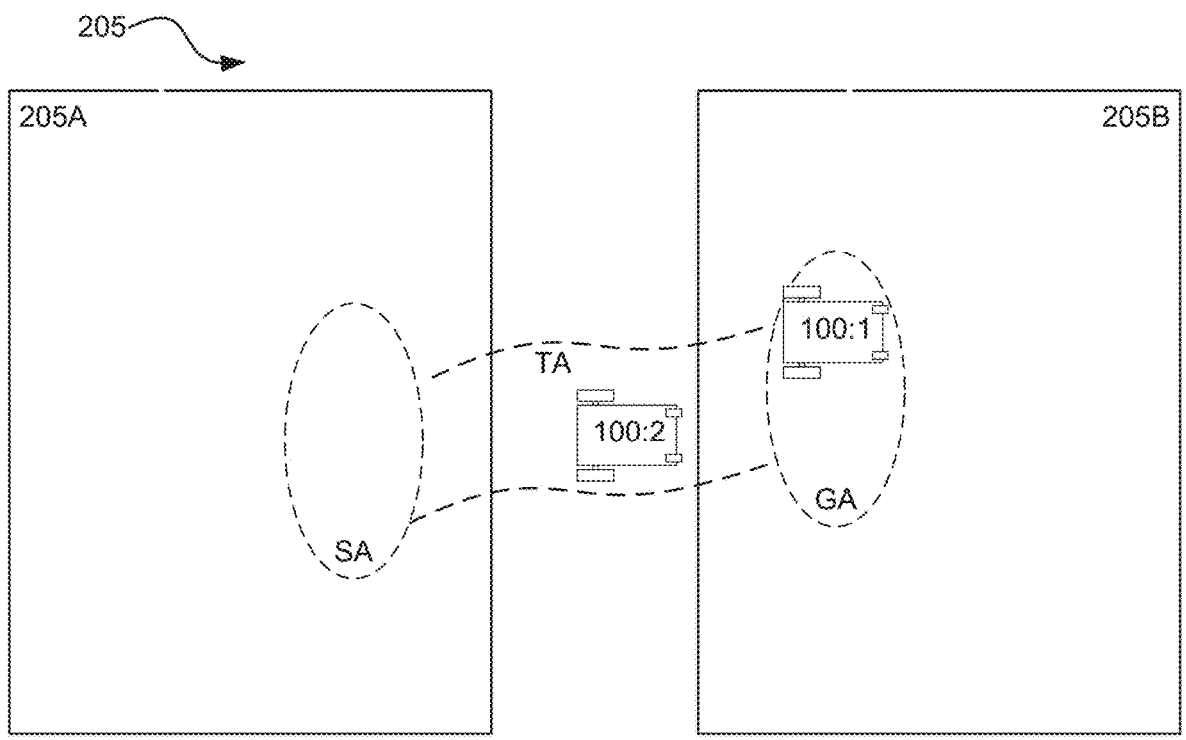
FIG. 2F shows a schematic view of a robotic work tool system according to some example embodiments of the teachings herein.

FIG. 2F shows a view of a robotic work tool system 200 as in FIGS. 2A, 2B, 2C, 2D and 2E where the first robotic work tool 100:1 has reached the goal area GA and the second robotic work tool 100:2 is still moving through the transport area TA.

As all robotic work tools have reached the goal area and thus completed the transport, the robotic work tools continue on their scheduled operation in the second work area, such as proceeding to operate by employing the work tool 160 or by navigating to the station 210 for example for charging.

Figure 2G:
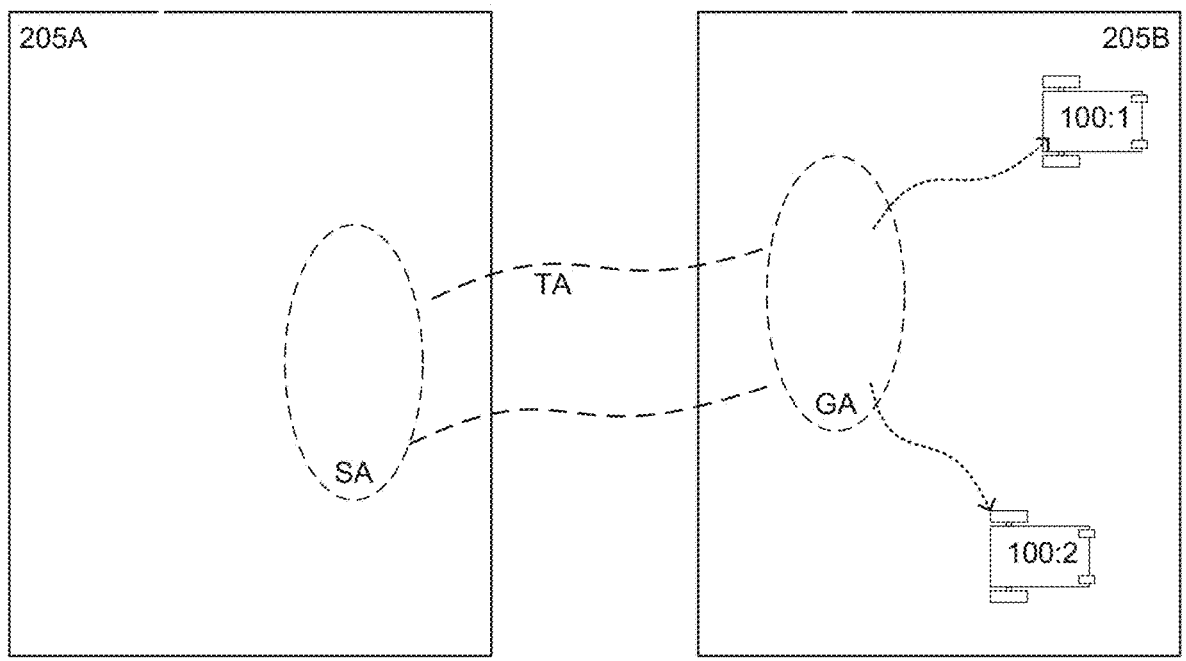
FIG. 2G shows a schematic view of a robotic work tool system according to some example embodiments of the teachings herein.

FIG. 2G shows a view of a robotic work tool system 200 as in FIGS. 2A, 2B, 2C, 2D, 2E and 2F where both the first robotic work tool 100:1 and the second robotic work tool 100:2 have reached the goal area GA and continue on their scheduled operation. It should be noted that in some embodiments the robotic work tool need not wait in the goal area for the robotic work tools behind, and is free to move to its intended goal, such as an operational position, for continued operation (including charging or deactivation).

FIG. 2G also shows transport paths from the transport area or goal area to the robotic work tools' individual operational positions. In some embodiments, the robotic work tool 100 is configured to follow such a transport path, which leads the robotic work tool on a path so that it does not interfere or risk colliding with another robotic work tool. In some such embodiments, the transport path is a path that keeps a minimum distance from the other robotic work tools 100. The minimum distance is in some examples 1, 5 10, in the range 1 to 5, in the range 1 to 10 meters. In some embodiments the robotic work tool determines the transport path, and in some embodiments the server 240 determines the transport path. The transport paths area shown as dotted arrows.

In some embodiments the robotic work tools, or at least some of them are partially operator controlled, or at least operator supervised. The robotic work tool may still be autonomous but be of such a type that they require human supervision, for example for legal reasons, such as when it comes to autonomously controlled farm equipment or large lawnmowers. The teachings herein find particular use in such embodiments, as it enables the supervisor to maintain an overview of all the robotic work tools during the transport.

Figure 2H:
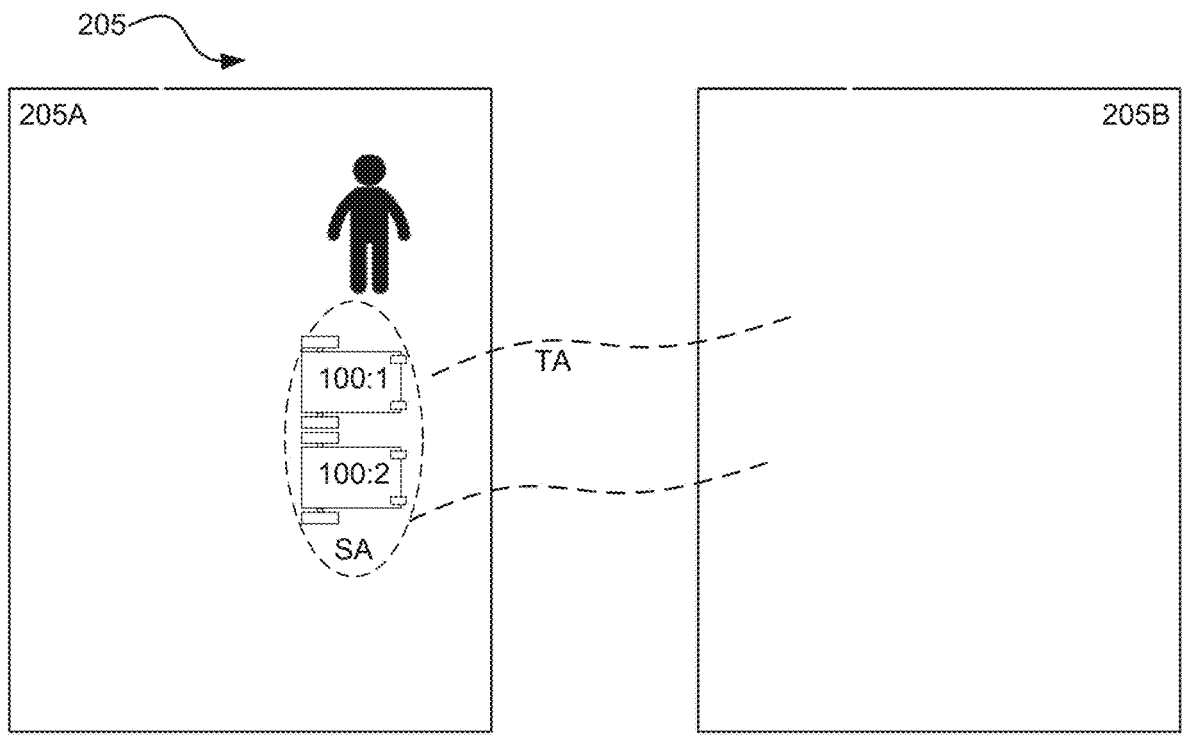
FIG. 2H shows a schematic view of a robotic work tool system according to some example embodiments of the teachings herein.

FIG. 2H shows a view of a robotic work tool system 200 as in FIGS. 2A to 2F where both the first robotic work tool 100:1 and the second robotic work tool 100:2 have reached the start area SA and are supervised by a human supervisor, such as a user or an operator.

In some such embodiments, the determination that a robotic work tool is to be transported can be that the supervisor initiates the transport, for example through a user equipment 250. This may in some embodiments be done by the supervisor signaling one, some or all of the robotic work tools indicating that transport is needed 100. Alternatively or additionally, this may in some embodiments be done by the supervisor signaling the server indicating that transport is needed for one, some or all of the robotic work tools 100.

Furthermore, in some such embodiments, the determination that it is time to be transported can be that the supervisor initiates the transport. This may be initiated by an active command by the supervisor, for example through inputting commands through a user equipment 250. In some embodiments the time can be determine das the time when the supervisor reaches the start area, which can be determined by monitoring the location of the user equipment 250 and as it enters or comes close to the start area, it is determined that the supervisor has reached the start area, and the robotic work tool(s) start to move through the transport area.

Enabling the supervisor to initiate the transport allows the supervisor to maintain an overview of the robotic work tools as they transport through the transport area.

Figure 2I:
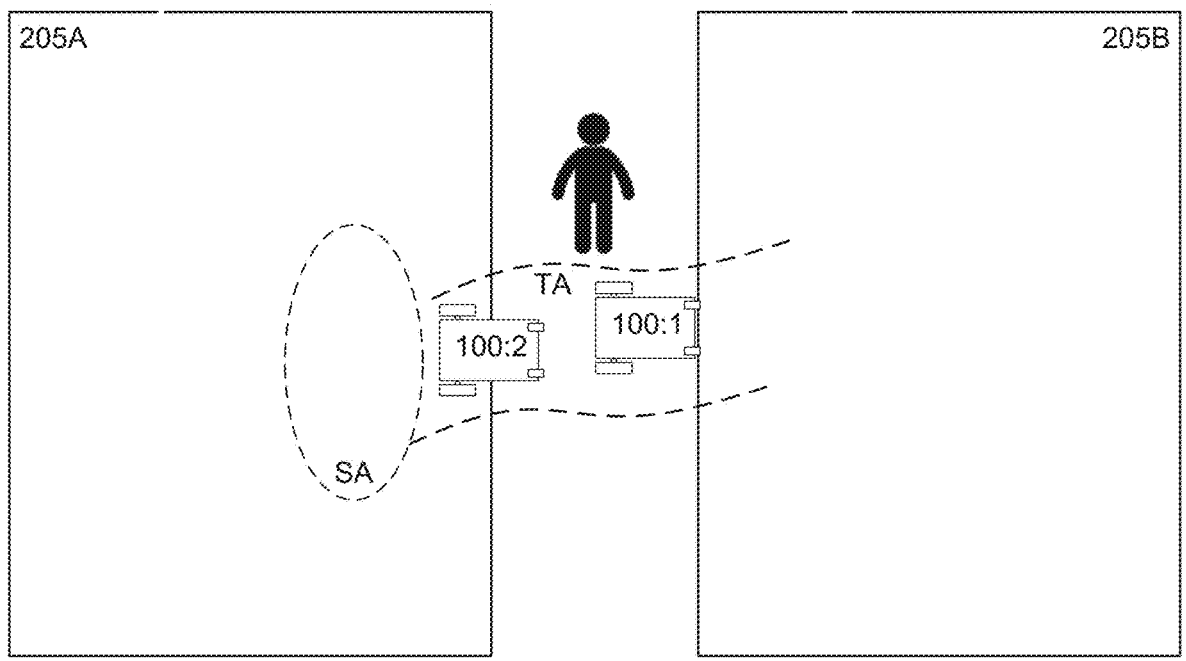
FIG. 2I shows a schematic view of a robotic work tool system according to some example embodiments of the teachings herein.

FIG. 2I shows a view of a robotic work tool system 200 as in FIGS. 2A to 2H where both the first robotic work tool 100:1 and the second robotic work tool 100:2 are moving through the transport area TA supervised by a human supervisor, such as a user or an operator.

In some such embodiments, the robotic work tool is configured to receive an indication of the supervisor's speed and to keep a same speed as the supervisor. The speed may be signaled directly from the supervisor (such as through the user equipment 250) or from the server 240.

In some such embodiments, the robotic work tool is configured to receive an indication that the supervisor has stopped, and in response thereto also stop. Alternatively the robotic work tool reduces its speed. The robotic work tool thus adapts the speed when the supervisor stops. This allows for the supervisor to stop without losing the overview of the group of robotic work tools being transported.

In some such embodiments, the robotic work tool is configured to receive an indication that the supervisor has reached the start area (again), and in response thereto adapting its speed, such as by stopping. Alternatively the robotic work tool reduces its speed. This allows for the supervisor to return to the start area, possibly for solving a problem, without losing the overview of the group of robotic work tools being transported.

In some such embodiments, the robotic work tool is configured to receive an indication of a speed from the supervisor, and in response thereto maintain the indicated speed. The indicated speed may be signaled directly from the supervisor (such as through the user equipment 250) or via the server 240. This allows the supervisor to control the speed of the robotic work tool(s) during the transport.

In some embodiments a robotic work tool 100 is configured to stop if it reaches or exceeds a maximum distance from the supervisor. In some such embodiments the maximum distance is reduced as the transport is initiated, thereby ensuring that the supervisor is enabled to overview the robotic work tools during the transport. As an example the maximum distance can be 20, 50 or 100 meters during operation and be reduced to 5, 10 or 25 meters during transport.

It should be noted that even though the supervisor discussed in relation to FIGS. 2H and 2I is a human supervisor, the supervisor may in some embodiments be a robotic work tool, for example a robotic work tool with higher capabilities than the other robotic work tools, acting as a leading or controlling robotic work tool.

Figure 3:
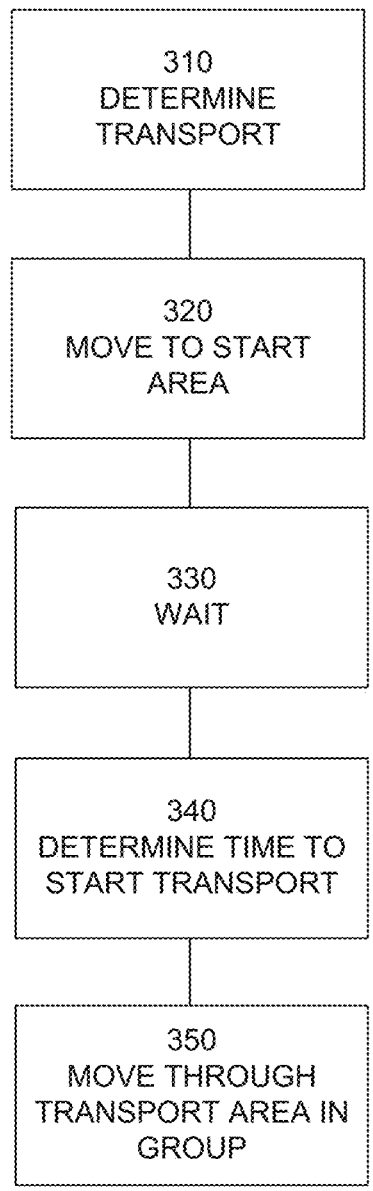
FIG. 3 shows a corresponding flowchart for a method according to some example embodiments of the teachings herein.

FIG. 3 shows a flowchart for a general method according to herein. The method is for use in a robotic work tool as in FIG. 1 in a manner as discussed above in relation to FIGS. 2A to 2I. The method comprises determining 310 that a transport is upcoming, and in response thereto moving 320 to a start area SA. When in the transport area waiting 330 for the second robotic work tool 100:2 to reach the start area SA; and then determining 340 that it is time to enter the transport area (TA), and in response thereto moving 350 through the transport area (TA) in a group.

The invention claimed is:

1. A robotic work tool system comprising a first robotic work tool and a second robotic work tool arranged to operate in an operational area comprising a transport area, the first robotic work tool comprising a controller, wherein the controller is configured to:

determine that a transport is upcoming, and in response thereto cause the first robotic work tool to move to a start area;

wait for the second robotic work tool to reach the start area; and then determine that it is time to enter the transport area, and in response thereto cause the first robotic work tool to move through the transport area, and wherein the controller is further configured to determine the time to enter the transport area by:

determining that a farthest away robotic work tool is at a first time distance away from the start area;

determining a second time distance through the transport area for the first robotic work tool, and holding the first robotic work tool within the start area until the first time distance and the second time distance are equal.

2. The robotic work tool system according to claim 1, wherein the controller is further configured to
cause the first robotic work tool to move through the transport area together with the second robotic work tool as a robotic work tool group.

3. The robotic work tool system according to claim 1, wherein the controller is further configured to cause the first robotic work tool to follow a transport path to the start area.

4. The robotic work tool system according to claim 1, wherein the controller is further configured to determine that a transport is upcoming:
at the beginning or end of an operation,
by determining that a charging is needed,
by receiving an indication that the transport is upcoming from a server,
by receiving an indication that the transport is upcoming from a user equipment, or
by receiving an indication that the transport is upcoming from the second robotic work tool.

5. The robotic work tool system according to claim 1, wherein the controller is further configured to determine that it is time to enter the transport area by:
determining that all other robotic work tools in a group of robotic work tools have reached the start area,
determining that all robotic work tools having signaled that a transport is upcoming have arrived at the start area,
determining that all robotic work tools having signaled that the transport is upcoming and are within a time distance of the start area at the time of signaling have arrived at the start area,
by receiving an indication that it is time to enter the transport area from a server,
by receiving an indication that it is time to enter the transport area from a user equipment, or
by receiving an indication that it is time to enter the transport area from the second robotic work tool.

6. The robotic work tool system according to claim 1, wherein the controller is further configured to determine that it is time to enter the transport area by determining that a last robotic work tool will be able to reach the start area as a second last robotic work tool enters the transport area.

7. The robotic work tool system according to claim 1, wherein the controller is further configured to cause the first robotic work tool to keep a first speed through the transport area, wherein the second robotic work tool is configured to keep a second speed through the transport area.

8. The robotic work tool system according to claim 7, wherein the first speed is higher than the second speed.

9. The robotic work tool system according to claim 7, wherein the first speed is the same as the second speed.

10. The robotic work tool system according to claim 1, wherein the controller is further configured to cause the first robotic work tool to keep a specified distance to the second robotic work tool in the transport area.

11. The robotic work tool system according to claim 1, wherein the controller is further configured to cause the first robotic work tool to determine that it is approaching the second robotic work tool in the transport area (TA), and in response thereto adapt its speed.

12. The robotic work tool system according to claim 11, wherein the controller is further configured to cause the first robotic work tool to adapt its speed by stopping, waiting and then proceeding.

13. The robotic work tool system according to claim 11, wherein the controller is further configured to cause the first robotic work tool to adapt its speed by reducing its speed.

14. The robotic work tool system according to claim 11, wherein the first robotic work tool further comprises a collision sensor, and wherein the controller is further configured to cause the first robotic work tool to determine that it is approaching the second robotic work tool utilizing the collision sensor.

15. The robotic work tool system according to claim 1, wherein the controller is further configured to:
receive an indication of a speed from a server,
cause the first robotic work tool to wait in a goal area for the second robotic work tool (100:2) to arrive in the goal area as the transport area is exited before proceeding, or
cause the first robotic work tool to follow a transport path out of the transport area.

16. The robotic work tool system according to claim 1, wherein the first robotic work tool is supervised by a supervisor, and wherein the supervisor is a robotic work tool, or a human operator.

17. The robotic work tool system according to claim 16, wherein the controller is further configured to:
cause the first robotic work tool to determine that a transport is upcoming by receiving an indication thereof from the supervisor,
cause the first robotic work tool to determine that it is time to enter the transport area by receiving an indication thereof from the supervisor, or
cause the first robotic work tool to receive an indication of a speed to keep through the transport area from the supervisor.

18. The robotic work tool system according to claim 16, wherein the controller is further configured to:
cause the first robotic work tool to receive an indication that the supervisor has stopped, and in response thereto adapt its speed,
cause the first robotic work tool to receive an indication that the supervisor has reached the start area, and in response thereto adapt its speed, or
cause the first robotic work tool to stop if it reaches or exceeds a maximum distance from the supervisor.

19. A method for use in a robotic work tool system comprising a first robotic work tool and a second robotic work tool arranged to operate in an operational area comprising a transport area, the method comprising
determining that a transport is upcoming, and in response thereto moving to a start area;
waiting for the second robotic work tool to reach the start area; and then
determining that it is time to enter the transport area, and in response thereto moving through the transport area,
wherein the controller is further configured to determine that it is time to enter the transport area by determining that a last robotic work tool will reach the start area at the same time a second last robotic work tool enters the transport area.

* * * * *